US011959305B1

(12) United States Patent
Martinez

(10) Patent No.: US 11,959,305 B1
(45) Date of Patent: Apr. 16, 2024

(54) ELEVATOR HOISTWAY DOOR KEY MULTI-TOOL

(71) Applicant: Miami Instrument and Tool Company, Miami, FL (US)

(72) Inventor: Roberto Martinez, Miami, FL (US)

(73) Assignee: Miami Instrument and Tool Company, Miami, FL (US)

( * ) Notice: Subject to any disclaimer, the term of this patent is extended or adjusted under 35 U.S.C. 154(b) by 785 days.

(21) Appl. No.: 17/069,251

(22) Filed: Oct. 13, 2020

Related U.S. Application Data

(60) Provisional application No. 62/915,078, filed on Oct. 15, 2019.

(51) Int. Cl.
*B25F 1/04* (2006.01)
*E05B 19/04* (2006.01)
*A45C 11/32* (2006.01)

(52) U.S. Cl.
CPC .............. *E05B 19/043* (2013.01); *B25F 1/04* (2013.01); *A45C 11/324* (2013.01)

(58) Field of Classification Search
CPC .... B25F 1/00; B25F 1/02; B25F 1/003; B25F 1/006; B25F 1/04; B25G 1/00; B25G 1/005; B25G 1/08; B26B 11/006; B25B 7/22; B25B 23/00; E05B 19/043; A45C 11/324
See application file for complete search history.

(56) References Cited

U.S. PATENT DOCUMENTS

| | | | | |
|---|---|---|---|---|
| 4,399,614 | A * | 8/1983 | Kertz | G01B 3/00 33/558.2 |
| 7,997,170 | B1 * | 8/2011 | Martinez | B25F 1/04 7/128 |
| 9,358,676 | B2 * | 6/2016 | King, Jr | B25G 1/08 |

* cited by examiner

*Primary Examiner* — Robert J Scruggs
(74) *Attorney, Agent, or Firm* — ALBERT BORDAS P.A.

(57) ABSTRACT

An elevator hoistway door key multi-tool for elevator technicians', maintenance workers', and emergency rescuers' use. The invention is used to open elevator hoistway doors of different types in an emergency when, sometimes, time is critic. Elevator hoistway door key multi-tool comprises a housing assembly having at least two pins, and an elevator hoistway door key assembly. The elevator hoistway door key assembly comprises at least two elevator hoistway door keys. Each of the at least two elevator hoistway door keys pivots at one of at least two pins. The elevator hoistway door keys comprises, but are not limited to, T-shaped key, semi-circular key and the flapper-type drop.

12 Claims, 2 Drawing Sheets

ELEVATOR HOISTWAY DOOR KEY MULTI-TOOL

II. BACKGROUND OF THE INVENTION

1. Field of the Invention

The present invention relates to tools, and more particularly, to elevator hoistway door key multi-tools for elevator technicians', maintenance workers', and emergency rescuers' use.

2. Other Related Applications

The present application claims priority of pending U.S. Provisional Application No. 62/915,078, filed on Oct. 15, 2019, which is hereby incorporated by reference.

3. Description of the Related Art

Applicant is not aware of any elevator hoistway door key multi-tools that suggest the novel features of the present invention.

III. SUMMARY OF THE INVENTION

The present invention is an elevator hoistway door key multi-tool, comprising a housing assembly, and a key assembly having a T-shaped key, a two-section flapper-type drop key, and a semicircular key.

The housing assembly comprises a first sidewall having first and second ends, a second sidewall having third and fourth ends, interior edges, a first pin, and a second pin. The first and second pins keep the first and second sidewalls substantially parallel and spaced apart from each other defining a cavity. The first pin is disposed at a first predetermined distance from the first and third ends without reaching the second and fourth ends. The second pin is disposed at a second predetermined distance from the second and fourth ends without reaching the first and third ends.

The T-shaped key comprises a wall, an exterior wall, a first distal end, and a first base having a first hole. The wall and the exterior wall extend from the first base and are at a perpendicular disposition with respect to each other.

The first base extends beyond the exterior wall at one side and beyond the wall at the opposite side, whereby a side protruding from the wall defines a first rounded corner and extends around the first hole. The opposite side of the first base defines a first notch and a first ridge. The first pin passes through the first hole, whereby the first base is pivotally mounted onto the first pin.

The two-section flapper-type drop key comprises a distal wall and a proximal wall connected to each other by a pivoting pin. The two-section flapper-type drop key further comprises a second base having a second hole, and an edge. The first pin passes through the second hole, whereby the second base is pivotally mounted to the first pin.

The proximal wall extends from the second base and the distal wall comprises a distal end. The distal wall is slightly longer that the proximal wall, whereby the distal wall is secured by the edge in a retracted position. The second base extends beyond the proximal wall, whereby the portion of the second base protruding from the proximal wall defines a second rounded corner at one side and extends around the second hole. The opposite side of the second base defines a second notch and a second ridge.

The semicircular key comprises a semicircular wall having a second distal end, and a third base with a third hole. The semicircular wall extends from the third base. The third base extends beyond the semicircular wall, whereby a portion of the third base protruding from the semicircular wall defines a third rounded corner at one side, and extends around the third hole. The opposite side of the third base defines a third notch and a third ridge.

The second pin passes through the third hole, whereby the third base is pivotally mounted to the second pin. The T-shaped key and the two-section flapper-type drop key are pivotally mounted to the first pin, whereby the T-shaped key is adjacent to the first sidewall, and the two-section flapper-type drop key is adjacent to the second sidewall.

A first portion of the second pin extends from the first sidewall a predetermined distance that is the same of the width of the third base, and a second portion of the second pin has a diameter larger than the first portion, and larger than the diameter of third hole, whereby third base keeps next to the first sidewall.

The exterior wall have the same dimension of the first base, and occupies a first half of the space between the first and second sidewalls, whereby the first half being adjacent to the first sidewall. The distal wall and the proximal wall are both the half of the dimension of the second base, whereby when they are aligned, occupies a second half of the space between the first and second sidewalls. The semicircular wall and the third base occupy a quarter of the space between the first and second sidewalls.

Once the T-shaped key and the two-section flapper-type drop key are aligned to each other, the first rounded corner, the first notch, and the first ridge are aligned with the second rounded corner, the second notch, and the second ridge respectively.

The key assembly is moved to a storage position inside the cavity, whereby the T-shaped key rotates until it is substantially parallel to the first and second sidewalls, the distal wall rotates until aligns with the proximal wall and both aligned are rotated until they are substantially parallel to the first and second sidewalls, and the semicircular key rotates until it is substantially parallel to the first and second sidewalls, whereby the semicircular key is substantially housed between the wall and the first sidewall.

It is one of the main objects of the present invention to provide an elevator hoistway door key multi-tool that comprises elevator hoistway door keys utilized by elevator technicians, maintenance workers, and emergency rescuers.

It is another object of this invention to provide an elevator hoistway door key multi-tool that can be readily utilized without the need of any special tools.

It is another object of this invention to provide an elevator hoistway door key multi-tool that comprises a carrying case with capacity to carry the multi-tool as well as a head assembly.

It is another object of this invention to provide an elevator hoistway door key multi-tool comprising specific tools to open a variety of elevator hoistway doors in the case of an emergency.

It is another object of this invention to provide an elevator hoistway door key multi-tool that is volumetrically efficient for carrying, transporting, and storage.

It is yet another object of this invention to provide such an elevator hoistway door key multi-tool that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE PREFERRED EMBODIMENT

Figure 1:
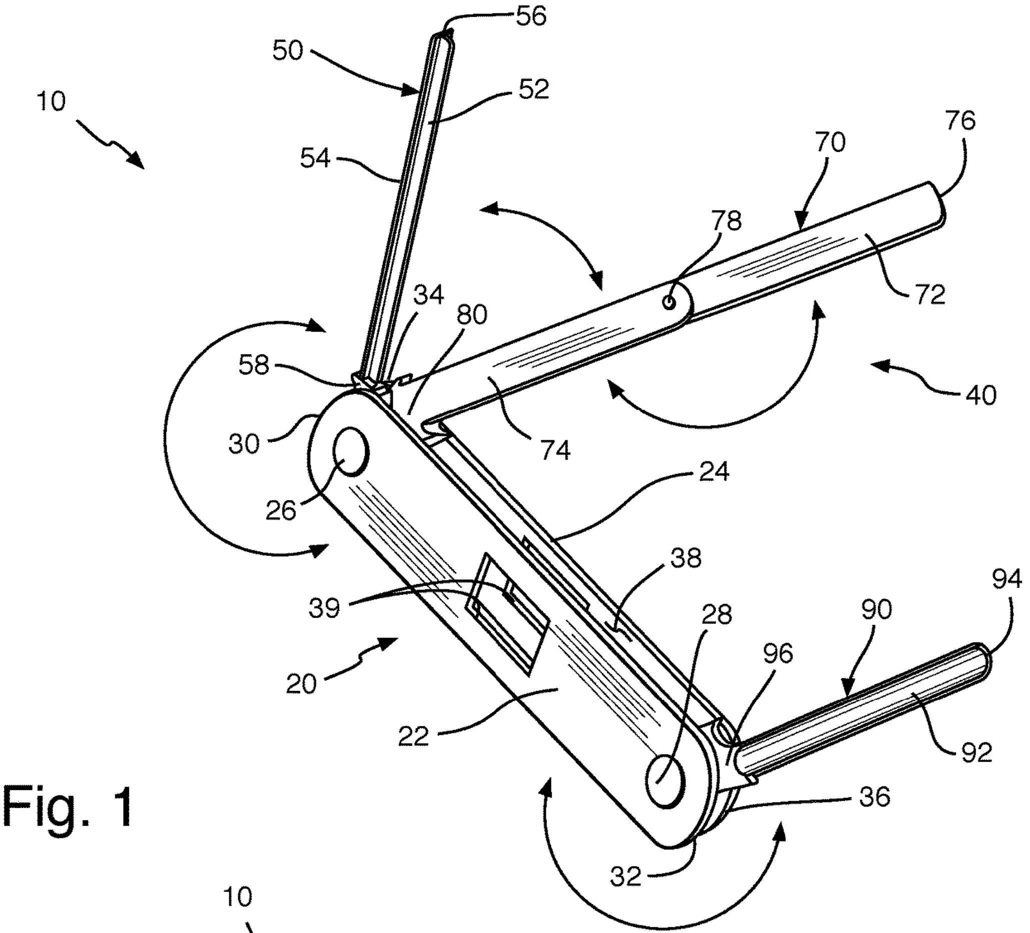
FIG. 1 is an isometric view of the present invention with its keys shown in a first extended position.

Referring now to the drawings, the present invention is an elevator hoistway door key multi-tool and is generally referred to with numeral 10. It can be observed that it basically includes housing assembly 20 and key assembly 40.

Present invention 10 is used to open elevator hoistway doors of different types in an emergency.

As seen in FIG. 1, housing assembly 20 comprises sidewalls 22 and 24. Sidewall 22 has ends 30 and 32. Sidewall 24 has ends 34 and 36. Pins 26 and 28 keep sidewalls 22 and 24 substantially parallel and spaced apart from each other. Pin 26 is disposed at a first predetermined distance from ends 30 and 34 without reaching ends 32 and 36. Pin 28 is disposed at a second predetermined distance from ends 30 and 34 without reaching ends 32 and 36. Sidewalls 22 and 24, and interior edge 39 define cavity 38. It is noted that interior edge 39 is of a cooperative size and shape to function as an oxygen bottle/cylinder wrench.

Key assembly 40 comprises T-shaped key 50, two-section flapper-type drop key 70, and semicircular key 90. Other elevator hoistway door keys may be incorporated onto present invention 10.

T-shaped key 50 comprises wall 52 and exterior wall 54. Wall 52 and exterior wall 54 are at a perpendicular disposition with respect to each other. T-shaped key 50 further comprises distal end 56 and base 58. Wall 52 and exterior wall 54 extend from base 58. Base 58 has hole 60, seen in hidden lines in FIGS. 4, 5, and 6. Pin 26 passes through hole 60. Base 58 is pivotally mounted onto pin 26.

Two-section flapper-type drop key 70 comprises distal wall 72 and proximal wall 74 connected to each other with pivoting pin 78. Distal wall 72 has distal end 76. Two-section flapper-type drop key 70 further comprises base 80.

Figure 4A:
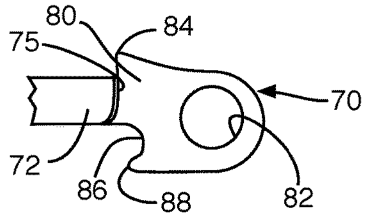
FIG. 4A is a partial side elevational view of the base of a two-section flapper-type drop key.

Base 80 has hole 82, seen in FIG. 4A. Pin 26 passes through hole 82. Base 80 is also pivotally mounted onto pin 26.

Semicircular key 90 comprises semicircular wall 92 with distal end 94. Semicircular key 90 further comprises base 96 with hole 98, seen in hidden lines in FIGS. 4, 5, and 6. Semicircular wall 92 extends from base 96. Pin 28 passes through hole 98. Base 96 is pivotally mounted onto pin 28.

Figure 2A:
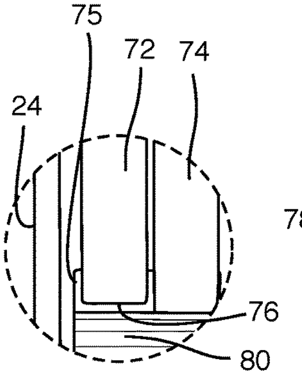
FIG. 2A is a zoomed in front elevational view of the present invention taken along 2A as seen in FIG. 2.
Figure 2:
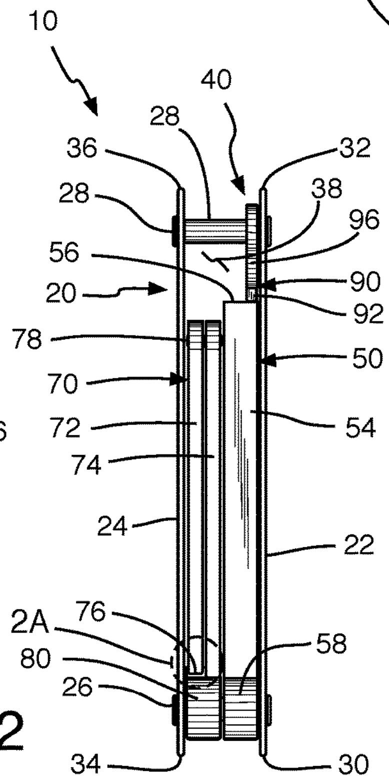
FIG. 2 is a front elevational view of the present invention with its keys shown in a retracted position.

As seen in FIG. 2, T-shaped key 50 and two-section flapper-type drop key 70 are pivotally mounted to pin 26. In a preferred embodiment, T-shaped key 50 is adjacent to sidewall 22, while two-section flapper-type drop key 70 is adjacent to sidewall 24.

Figure 3:
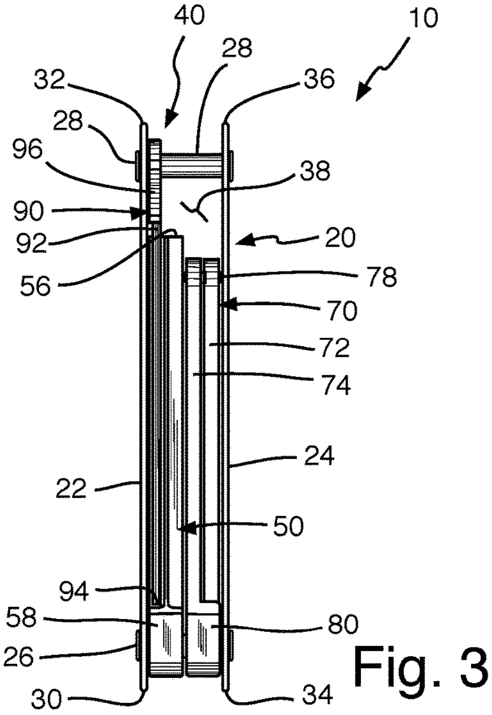
FIG. 3 is a rear elevational view of the present invention with its keys shown in the retracted position.

As seen in FIG. 3, semicircular wall 92 and base 96 occupy a quarter of the space between sidewalls 22 and 24.

Figure 4:
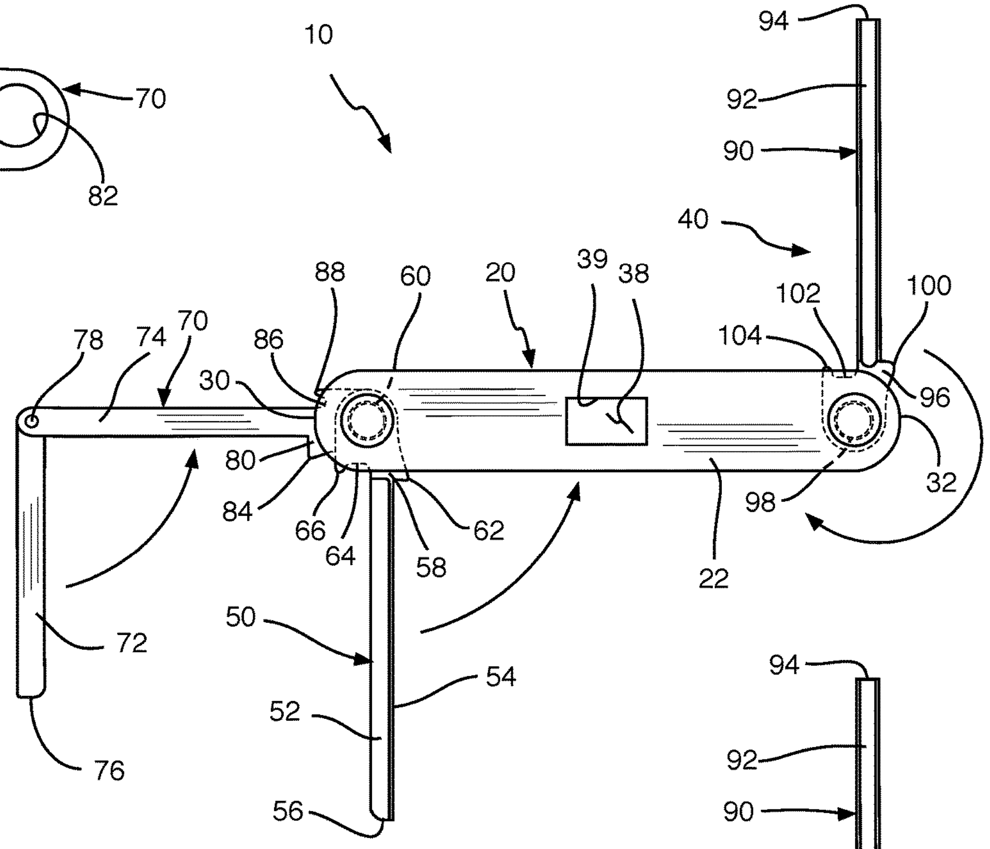
FIG. 4 is a first side elevational view of the present invention with its keys shown in a second extended position.

As seen in FIGS. 4 and 4A, pin 26 has a cooperative diameter to snugly fit within holes 60 and 82, seen in FIG. 4A, while permitting a rotation of bases 58 and 80 with respect to pin 26. A first portion of pin 28 has a cooperative diameter to snugly fit through hole 98, while permitting a rotation of base 96 with respect to pin 28. The first portion of pin 28 extends from sidewall 22 a predetermined distance that is the same of the width of base 96. The second portion of pin 28 has a diameter larger than the first portion, and therefore, larger that the diameter of hole 98, which force base 96 to be kept next to sidewall 22.

Each of bases 58 and 80 occupies half of pin 26. Accordingly, exterior wall 54, having a same dimension as base 58, occupies a first half of a space between sidewalls 22 and 24, whereby a first half being adjacent to sidewall 22. Distal wall 72 and proximal wall 74 are both the half of the dimension of base 80, in a way that, when they are aligned as shown in FIGS. 2 and 3, they occupy the second half of the space between sidewalls 22 and 24.

Proximal wall 74 extends from base 80. It is noted that distal wall 72 is slightly longer that proximal wall 74 so that distal wall 72 is secured by edge 75, whereby distal end 76 contacts edge 75, also seen in FIG. 2A, to stay in place until a force is applied onto notch 86 and ridge 88 to lift/remove distal wall 72 to the extended position.

Figure 5:
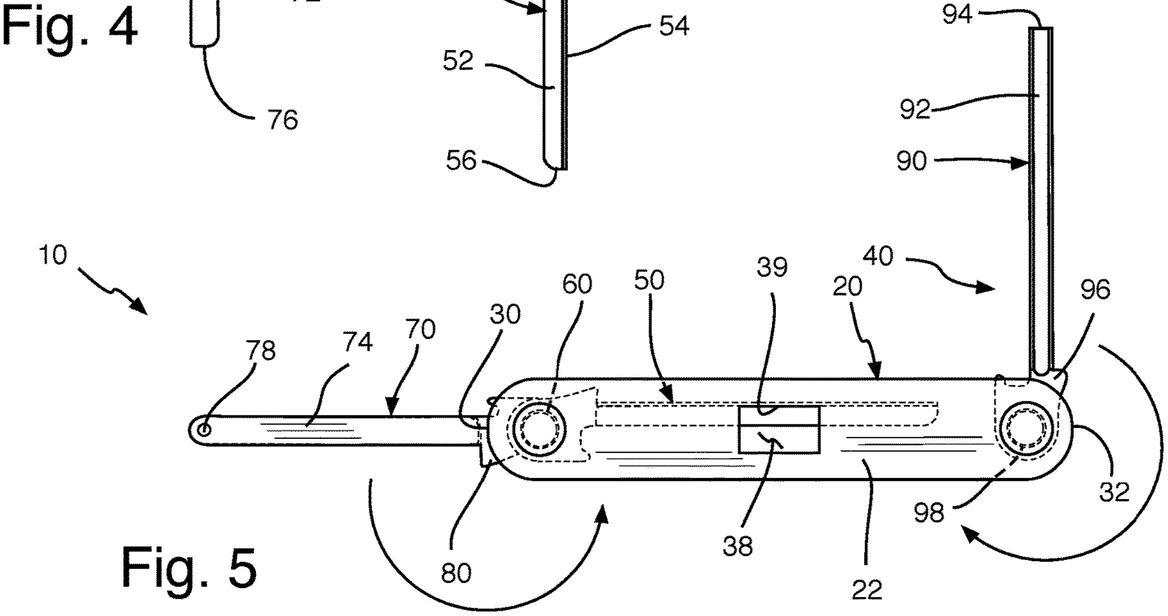
FIG. 5 is a second side elevational view of the present invention with a T-shaped key shown in the retracted position, the two-section flapper-type drop key shown in a partially retracted position, and a semicircular key shown in the second extended position.
Figure 6:
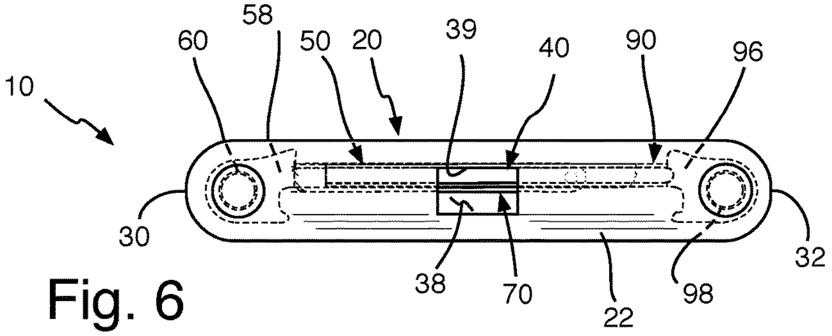
FIG. 6 is a third side elevational view of the present invention with its keys shown in the retracted position.

As best seen in FIGS. 4, 5 and 6, base 58 extends beyond exterior wall 54 at one side and beyond wall 52 at an opposite side. The side protruding from exterior wall 54 defines rounded corner 62 and extends around hole 60. The opposite side of base 58 defines notch 64 and ridge 66.

In the same way, base 80 extends beyond proximal wall 74. At one side, the portion of base 80 protruding from proximal wall 74 defines rounded corner 84 and extends around hole 82. The opposite side of base 80 defines notch 86 and ridge 88. Notch 86 is used to pry/extend two-section flapper-type drop key 70 from the retracted position.

Also, base 96 extends beyond semicircular wall 92. At one side, the portion of base 96 protruding from semicircular wall 92 defines rounded corner 100 and extends around hole 98. The opposite side of base 96 defines notch 102 and ridge 104.

Once T-shaped key 50 and two-section flapper-type drop key 70 are aligned to each other, rounded corner 62, notch 64 and ridge 66 are aligned with rounded corner 84, notch 86 and ridge 88 too, respectively.

When elevator hoistway door key multi-tool 10 is not in use, a user conveniently moves key assembly 40 to a storage position, inside cavity 38. For storage position, the user rotates T-shaped key 50 into the space defined by sidewalls 22 and 24 until it is substantially parallel to the lateral edges of sidewalls 22 and 24. Then, the user rotates distal wall 72 until it is aligned with proximal wall 74; and both aligned are rotated into cavity 38 until they are substantially parallel to the lateral edges of sidewalls 22 and 24. Finally, the user rotates semicircular key 90 into cavity 38 until it is substantially parallel to the lateral edges of sidewalls 22 and 24. At the final storage position, semicircular key 90 will be substantially housed within the space between wall 52 and sidewall 22 as best seen in FIG. 4.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An elevator hoistway door key multi-tool, comprising:

A) a housing assembly comprising a first sidewall having first and second ends, a second sidewall having third and fourth ends, interior edges, a first pin, and a second pin, whereby said first and second pins keep said first and second sidewalls substantially parallel and spaced apart from each other defining a cavity; and B) a key assembly having a T-shaped key, a two-section flapper-type drop key, and a semicircular key wherein said T-shaped key comprises a wall, an exterior wall, a first distal end, and a first base having a first hole, whereby said wall and said exterior wall extend from said first base and are at a perpendicular disposition with respect to each other, said first base extends beyond said exterior wall at one side and beyond said wall at an opposite side, whereby a side protruding from said wall defines a first rounded corner and extends around said first hole, and said opposite side of said first base defines a first notch and a first ridge, said two-section flapper-type drop key comprises a distal wall and a proximal wall connected to each other by a pivoting pin, a second base having a second hole, and an edge, said first pin passes through said second hole, whereby said second base is pivotally mounted to said first pin, said exterior wall have a same dimension of said first base, and occupies a first half of a space between said first and second sidewalls, whereby said first half being adjacent to said first sidewall, said distal wall and said proximal wall are both half of a dimension of said second base, whereby when aligned in a retracted position, occupy a second half of said space between said first and second sidewalls, said T-shaped key and said two-section flapper-type drop key are pivotally mounted to said first pin, whereby said T-shaped key is adjacent to said first sidewall, and said two-section flapper-type drop key is adjacent to said second sidewall.

2. The elevator hoistway door key multi-tool set forth in claim 1, further characterized in that said first pin is disposed at a first predetermined distance from said first and third ends without reaching said second and fourth ends, and said second pin is disposed at a second predetermined distance from said second and fourth ends without reaching said first and third ends.

3. The elevator hoistway door key multi-tool set forth in claim 1, further characterized in that said first pin passes through said first hole, whereby said first base is pivotally mounted onto said first pin.

4. The elevator hoistway door key multi-tool set forth in claim 1, further characterized in that said proximal wall extends from said second base and said distal wall comprises a second distal end, said distal wall is slightly longer that said proximal wall, whereby said distal wall is secured by said edge in a retracted position.

5. The elevator hoistway door key multi-tool set forth in claim 1, further characterized in that said second base extends beyond said proximal wall, whereby a portion of said second base protruding from said proximal wall defines a second rounded corner at one side and extends around said second hole, and an opposite side of said second base defines a second notch and a second ridge.

6. The elevator hoistway door key multi-tool set forth in claim 5, further characterized in that once said T-shaped key and said two-section flapper-type drop key are aligned with each other, said first rounded corner, said first notch, and said first ridge are aligned with said second rounded corner, said second notch, and said second ridge respectively.

7. The elevator hoistway door key multi-tool set forth in claim 1, further characterized in that said semicircular key comprises a semicircular wall having a second distal end, and a third base with a third hole, whereby said semicircular wall extends from said third base.

8. The elevator hoistway door key multi-tool set forth in claim 7, further characterized in that said third base extends beyond said semicircular wall, whereby a portion of said third base protruding from said semicircular wall defines a third rounded corner at one side, and extends around said third hole, and an opposite side of said third base defines a third notch and a third ridge.

9. The elevator hoistway door key multi-tool set forth in claim 7, further characterized in that said second pin passes through said third hole, whereby said third base is pivotally mounted to said second pin.

10. The elevator hoistway door key multi-tool set forth in claim 7, further characterized in that a first portion of said second pin extends from said first sidewall a predetermined distance that is a same of a width of said third base, and a second portion of said second pin has a first diameter larger than said first portion and larger than a second diameter of said third hole, whereby said third base keeps next to said first sidewall.

11. The elevator hoistway door key multi-tool set forth in claim 7, further characterized in that said semicircular wall and said third base occupy a quarter of space between said first and second sidewalls.

12. The elevator hoistway door key multi-tool set forth in claim 7, further characterized in that said key assembly is moved to a storage position inside said cavity, whereby said T-shaped key rotates until it is substantially parallel to said first and second sidewalls, said distal wall rotates until it aligns with said proximal wall and both aligned are rotated until they are substantially parallel to said first and second sidewalls, and said semicircular key rotates until it is substantially parallel to said first and second sidewalls, whereby said semicircular key is substantially housed between said wall and said first sidewall.

* * * * *